United States Patent
Takeda et al.

(10) Patent No.: US 6,549,302 B1
(45) Date of Patent: Apr. 15, 2003

(54) IMAGE FORMING APPARATUS CAPABLE OF CHANGING PARAMETERS OF DOCUMENT FILE DATA

(75) Inventors: Yoshiko Takeda, Yokohama (JP); Takeshi Ogaki, Tama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/380,201

(22) PCT Filed: Nov. 6, 1998

(86) PCT No.: PCT/JP98/05006
§ 371 (c)(1),
(2), (4) Date: Aug. 26, 1999

(30) Foreign Application Priority Data

Dec. 26, 1997 (JP) .............................................. 9-366787

(51) Int. Cl.$^7$ .............................................. G06F 13/00
(52) U.S. Cl. ........................ 358/1.9; 358/1.5; 358/448; 707/514
(58) Field of Search ........................... 358/1.1, 1.5, 1.9, 358/1.12, 1.13, 1.14, 448, 452; 707/514, 515, 525, 530

(56) References Cited

U.S. PATENT DOCUMENTS

| 5,485,368 | A | | 1/1996 | Ogaki | 364/191 |
|---|---|---|---|---|---|
| 5,819,040 | A | * | 10/1998 | Ogaki | 707/514 |
| 5,893,124 | A | | 4/1999 | Ogaki | 707/507 |
| 6,151,610 | A | * | 11/2000 | Senn et al. | 707/516 |

FOREIGN PATENT DOCUMENTS

| JP | 2-214982 | 8/1990 |
|---|---|---|
| JP | 3-263182 | 11/1991 |
| JP | 4-268671 | 9/1992 |
| JP | 6-290214 | 10/1994 |
| JP | 7-78181 | 3/1995 |
| JP | 8-185507 | 7/1996 |
| JP | 10-13642 | 1/1998 |

* cited by examiner

Primary Examiner—Mark Wallerson
(74) Attorney, Agent, or Firm—Foley & Lardner

(57) ABSTRACT

An image forming apparatus having a reading function of reading the images of manuscripts, an attribute judging function of judging types of the attributes of the read-out images, a memory area for storing the images according to rules corresponding to the attributes judged, the function of changing the types of attributes of said images stored in the memory area, and an image forming function of forming images on the basis of the images stored.

3 Claims, 14 Drawing Sheets

| OPERATION ID | INPUT DATE | INPUT TIME | PROCESSING STATE | NO. OF DOCUMENTS | POINTER TO DOCUMENT DATA LIST |
|---|---|---|---|---|---|
| 1 | 1997.08.20 | 12:00:00 | SHEET SENSING COMPLETE | 3 | |
| 2 | 1997.08.21 | 10:00:00 | STILL SHEET SENSING | 2 | |
| 3 | 1997.08.22 | 11:00:00 | STILL SCANNING | 3 | |

23b

| DOCUMENT ID | DOCUMENT ORDER | NO. OF PAGES | POINTER TO PAGE DATA |
|---|---|---|---|
| 1 | 1 | 3 | |
| 2 | 2 | 10 | |
| 3 | 3 | 5 | |

23c

| PAGE ID | DOCUMENT ORDER | ATTRIBUTE | IMAGE FILE NAME |
|---|---|---|---|
| 1 | 1 | SHEET | Page1.img |
| 2 | 2 | DOCUMENT | Page2.img |
| 3 | 3 | DOCUMENT | Page3.img |

| OPERATION 1 | DOCUMENT 1 | PROPERTY OF PAGE 1 |
|---|---|---|
| INPUT DATE AND TIME | | 12:00:00 AUGUST 20, 1998 |
| OPERATION ID | | 1 |
| DOCUMENT ID | | 1 |
| INPUT ORDER | | 1 |
| ATTRIBUTE | | ⊙ SHEET ○ DOCUMENT |
| IMAGE FILE NAME | | Page1.img |

OK      CANCEL

FIG. 8

CAUTION

ALTHOUGH THE SELECTED DOCUMENTS WERE NOT INPUTTED IN ONE OPERATION, IS IT ALL RIGHT TO COMBINE THEM?

YES      NO

FIG. 9

IMAGE FORMING APPARATUS CAPABLE OF CHANGING PARAMETERS OF DOCUMENT FILE DATA

TECHNICAL FIELD

This invention relates to an image processing system which reads, for example, manuscripts and carries out image processing on the basis of the management information corresponding to the images of the read-out manuscripts.

BACKGROUND ART

The technique for treating pages of manuscript images consecutively read in one operation as one unit and combining/dividing the units in an image processing system has been already disclosed.

For example, the existing application software treats pages of manuscripts consecutively read in one operation as one document. With the software, the first pages of the individual documents are listed in the form of reduced-size images. When the user selects a document displayed in a reduced-size image, moves (drags) it, and determines another document displayed in a reduced-size image to which the current document is to be moved (dropped), the page of the selected document is inserted in the first page of the document on which the current document has dropped, thereby combining the two documents into one.

Furthermore, when the user selects a document, causes a menu to appear, and selects the command [BREAKUP], the pages of the document are divided page by page.

On the other hand, the technique for taking in documents at a time in one read operation has been already disclosed.

For example, the technique is such that a special sheet with a specific mark printed on a specific area is inserted between documents, all the documents are set in an automatic document feeder, and the images of all the documents are inputted in one operation. Then, it is sensed whether the inputted image is about the sheet. If it has been sensed that it is about the sheet, the documents are divided into those before and after the sheet and each of the two groups of documents is treated as an independent single document.

These techniques are used for image filing by which images of manuscripts are stored document by document.

The conventional techniques have the following problems:

1) When documents are read consecutively in one operation, a special sheet representing the end of a document is sensed, the documents are divided automatically on the basis of the sheet, and the groups of documents after division are treated as single units. As a result, after the division, information on the order in which the individual documents are read is lost. If there has been an error in sensing the sheet, the user has to check which documents the user has inputted consecutively and combine them, which makes the operation complex.

2) Although the read history management or read order management of documents is not carried out, two documents are combined by the operation of selecting a document and dropping it on another document. Thus, the user's erroneous operation leads to the error of combining documents unrelated to each other.

3) Even when all the manuscripts have been read physically by a high-speed scanner, the processes, including image transfer and the sensing of the special sheet, may be still in progress. In this case, the user knows which data items have been processed only after the user has processed the data items, which makes the operation complex.

As described above, when documents are read consecutively in one operation and the images of manuscripts read consecutively are automatically divided using a special sheet as an end, the following problems arise: the operation on the automatically divided documents after reading becomes complex and the processing state of documents is unknown.

DISCLOSURE OF THE INVENTION

The object of the present invention is to provide an image processing system which facilitates the operation on the automatically divided documents after reading and makes the processing state of documents clear, when reading documents consecutively in one operation and automatically dividing the consecutively read images of manuscripts using a special sheet as an end.

An image forming apparatus of the present invention comprises: reading means for reading images of manuscripts; attribute judging means for judging types of attributes of the images read by the reading means; storage means for storing the images read by the reading means, on the basis of rules corresponding to the attributes judged by the attribute judging means; attribute changing means for changing the types of the attributes of the images stored in the storage means; and image forming means for forming an image on the basis of the images stored in the storage means.

With the above configuration of the invention, even when, for example, a manuscript has been misjudged to be a sheet for division, groups of documents can be combined quickly by setting the attribute of the sheet for division and the attributes of normal documents and editing the attributes readily, instead of treating once judged documents and sheets as unchangeable as in the prior art. Furthermore, the process of dividing consecutive manuscripts into groups can be carried out easily by changing the attributes of the sheets and documents.

BRIEF DESCRIPTION OF DRAWINGS

FIG. 3 are diagrams to help explain an operation management table, a document management table, and a page management table;

FIG. 8 is an illustration to help explain a detailed example of displaying a page;

FIG. 9 is an illustration to help explain an example of displaying a caution to the user;

BEST MODE OF CARRYING OUT THE INVENTION

Hereinafter, referring to the accompanying drawings, an embodiment of the present invention will be explained.

Figure 1:
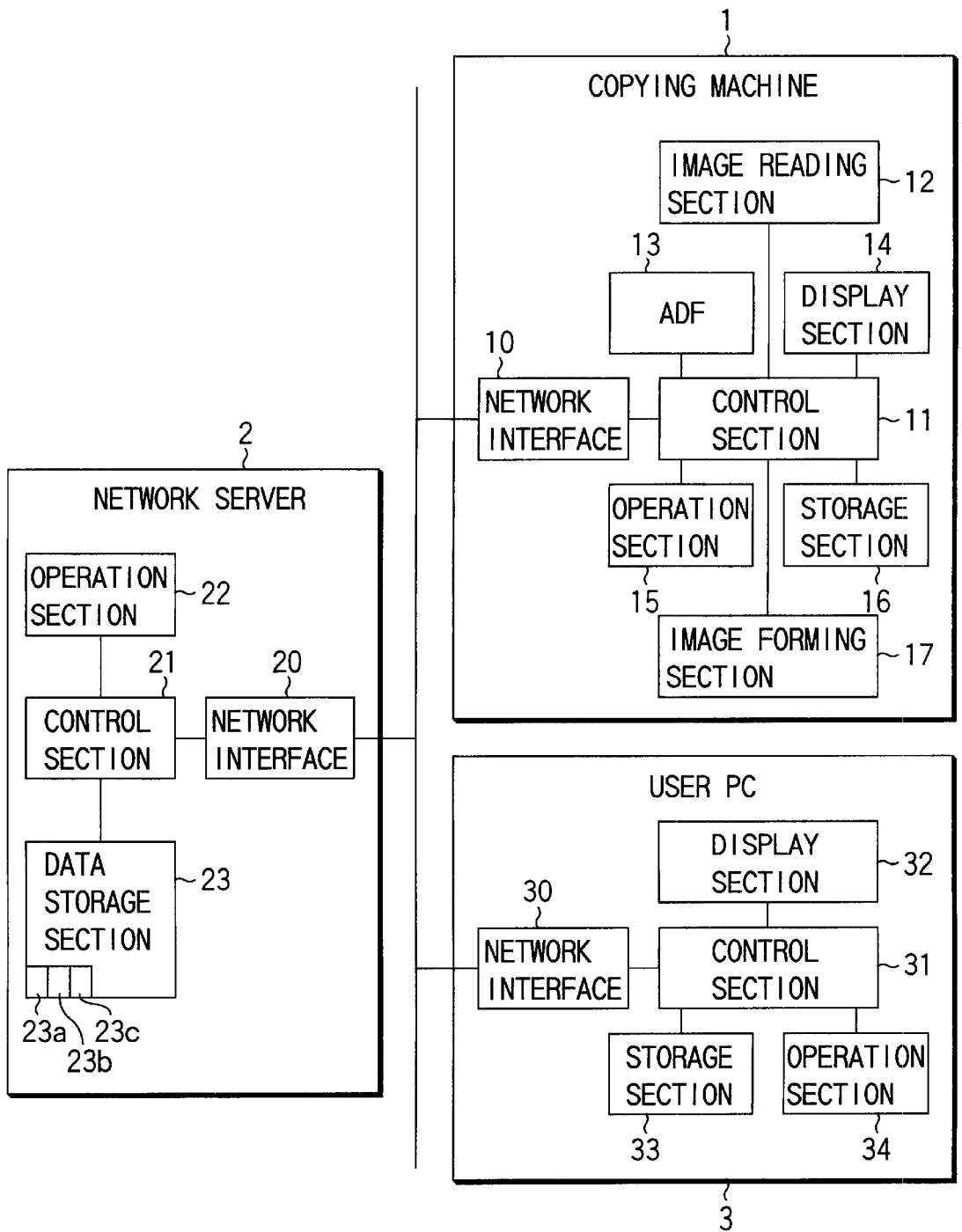
FIG. 1 is a block diagram showing a schematic configuration of an image processing system according to an embodiment of the present invention.

FIG. 1 shows a configuration of an image processing system according to an embodiment of the present invention.

As shown in FIG. 1, the system comprises a copying machine 1 having an image reading section that reads manuscripts consecutively, a network server 2 that stores not only the images of manuscripts but also the management data items corresponding to the manuscript images, and a user PC 3 that is operated directly by the user and displays or changes the manuscript images or management data items stored in the network server 2. The copying machine 1, network server 2, and user PC 3 are connected to each other via a communication circuit 23.

The copying machine 1 is composed of a control section 11, an image reading section 12, an automatic document feeder (ADF) 13, a display section 14, an operation section 15, a storage section 16, an image forming section 17, and a network interface 10. In the configuration of the image processing system, a desktop reading device (or scanner) including a control section, an image reading section, and an automatic document feeder may be used in place of the copying machine 1.

The image reading section 12 reads, one by one, the manuscripts set by the user in the automatic document feeder 13 and converts them into image data on the manuscript images.

In the automatic document feeder 13, the order in which the set manuscripts are read is determined beforehand as follows: the manuscripts should be read, starting at the last page up to the first page or at the first page down to the last page.

For example, when copying manuscripts are set with the right side upward and the manuscripts are read, starting at the bottommost manuscript on the document feeder 13, the opposite of the order in which the image reading section 12 has read the manuscripts is the order of manuscripts.

When manuscripts are set with the right side downward in a desktop reader and the manuscripts are read, starting at the bottommost manuscript on the document feeder 13, the order in which the image reading section 12 has read the manuscripts is the order of manuscripts.

The network server 2 is composed of a control section 21, an operation section 22, a data storage section 23, and a network interface 20.

The control section 21 senses the image of a sheet from the manuscript images stored in the data storage section 23. On the basis of an instruction given by the user, the control section writes, reads, or changes the management data stored in the data storage section 23.

The data storage section 23 stores the read-out manuscript images and various data items. The data storage section 23 includes an operation management table 23a that treats pages of manuscript images read in one operation by the user as one operation unit, a document management table 23b that stores management data on documents belonging to individual operations, and a page management table 23c that stores management data on manuscripts of at least one page constituting the individual documents.

The operation management table 23a stores management data on the manuscript images read in each operation unit.

The document management table 23b stores management data in such a manner that it uses a sheet S in the consecutive manuscript images in the order of manuscripts as the first page and treats the manuscript images from the first page up to immediately before the next sheet S as one document unit.

The page management table 23c stores management data on each page, including the attributes and the order of manuscripts, for the manuscript images constituting each document.

The user PC 3 comprises a control section 31, a display section 32, a storage section 33, an operation section 34, and a network interface 30.

The control section 31 senses how the user has operated on the contents of the display from the operation section 34 on the basis of the screen on the display section 32. On the basis of an instruction given by the user from the operation section 34, the control section 31 changes the management data in the data storage section 23 of the network server 2.

The display section 32 displays what hierarchical structure is used for management on the basis of the operation management table 23a, document management table 23b, and page management table 23c in the data storage section 23 of the network server 2. It also displays what attributes the individual images have.

The storage section 33 stores the data appearing on the display section 32 controlled by the control section 31 and various data items, including the icons and mouse pointers appearing on the display section 32.

The operation section 34 is composed of a keyboard and a pointing device, such as a mouse. At the operation section, the user carries out various operations, including the changing of the attributes of images.

The above configuration can be provided, without physical restrictions, on the individual devices connected to each other through a network. Namely, each component part constituting the present invention may be provided on any device on the network and is not restricted to the above configuration.

Figure 2:
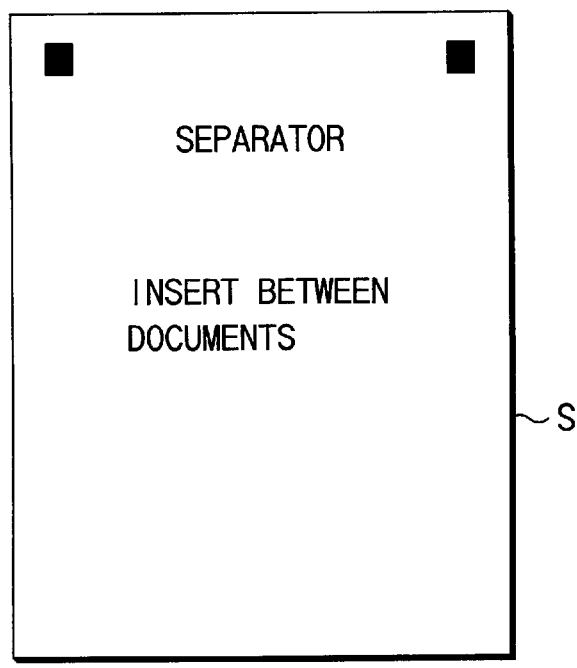
FIG. 2 shows an example of a sheet used between documents included in manuscripts.

FIG. 2 shows an example of a special sheet (or a separator) S used to divide documents.

As shown in FIG. 2, at the top of the sheet S, black rectangular areas indicating sheet S are printed in predetermined positions in a predetermined size. In the middle, the character string [SEPARATOR] indicating the function of sheet S is printed. In addition, the character string [INSERT BETWEEN DOCUMENTS] showing the way of using sheet S is printed.

When more black pixels than a predetermined number are present in a predetermined area on the image read by the image reading section 12 of the copying machine 1, the control section 11, control section 21, or control section 31 judges that the image is about sheet S.

Furthermore, on sheet S, guidance telling the user how to use the sheet is printed in such a manner that the user can recognize it at a glance. The objects used to sense the special sheet S are not limited to the black pixels printed in the rectangular areas. As long as a predetermined image process in the image processing system can judge that the objects represent sheet S, the objects may be any symbols, such as special marks, such as ⌈ or +, character strings of alphanumeric characters, or geometrical patterns like bar-codes.

FIG. 3 shows an example of the operation management table 23a, document management table 23b, and page management table 23c in the data storage section 23 of the network server 2.

The operation management table 23a is made up of an operation ID column, an input date column, an input time column, a number-of-documents column, a processing state column, and a pointer-to-document management table 23b column. In the operation ID column, identifiers used to uniquely identify the read operation by the user are stored. In the read date column, the date on which the read operation was carried out is stored. In the read time column, the time at which the read operation was carried out is stored. In the processing state column, the processing state of the manuscript image or management data read in each operation is stored. In the number-of-documents column, the number of documents into which the manuscripts read in one operation were divided by the sheet is stored. In the pointer-to-document management table 23b column, pointers to the document data lists storing the documents belonging to the individual operations are stored.

The operation management table 23a makes it possible to find, operation by operation, when each operation was carried out, what processing is now in progress, how many documents divided by the sheet are present in the read-out data, or where to refer to concerning each document.

The document management table 23b is made up of a document ID column, a number-of-document-in-the-order-of-manuscript column, a number-of-pages column, and a pointer-to-page management table 23c column. In the document ID column, identifiers used to uniquely identify the documents included in the manuscripts read in one operation are stored. In the number-of-document-in-the-order-of-manuscripts column, a value indicating how many documents there are in front of the current document, counting from the first document of the manuscripts, on the basis of [the order of manuscripts] judged by the control section 11 is stored. In the number-of-pages column, the number of pages constituting a document is stored. In the pointer-to-page management table 22c column, the pointer to the page management table 23c storing the page information constituting a document is stored.

The document management table 23b makes it possible to find, document by document, the order of documents, how many pages constitute a document, and where to refer to concerning information on the pages constituting the document.

The page management table 23c is made up of a page ID column, a manuscript order column, an attribute column, and an image file name column. In the page ID column, page identifiers used to uniquely identify the individual pages constituting documents are stored. In the manuscript order column, a value indicating how many documents there are in front of each document, counting from the first page of the manuscript, on the basis of [the order of manuscripts] judged by the control section 11 is stored. In the attribute column, whether the page is about either [a document image] or [a sheet image] is stored. In the image file name column, a file name storing image data on each page is stored.

The page management table 23c makes it possible to find, page by page, the order of pages, whether the attribute is for manuscript or for sheet, and where the manuscript image corresponding to the page data is stored.

Figure 4:
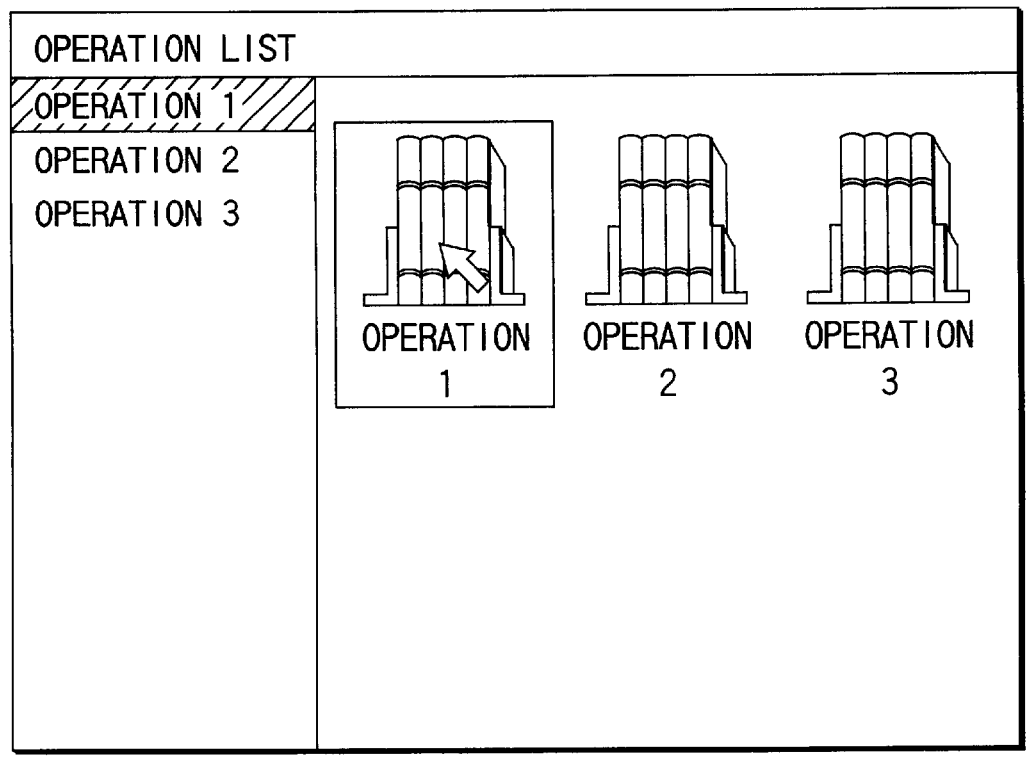
FIG. 4 is an illustration to help explain an example of displaying operations on the basis of the contents of the operation management table.

FIG. 4 shows an example of the operation display screen for the operation management data stored in the operation management table 23a in the data storage section 23 of the network server 2.

As shown in FIG. 4, at the top of the screen, the character string [OPERATION LIST] indicating the contents of the display appears. On the left side, a list of operations being managed is displayed together with operation IDs. On the right side, a list of operations is displayed in icons. An arrow that allows the user to select an operation is displayed. The user moves the arrow to an operation icon displayed and clicks the mouse, thereby selecting the operation. The selected operation is highlighted by a bold frame. At the same time, in the tree representation on the left, the selected operation is highlighted by reverse representation. This enables the user to recognize the selected operation at a glance.

Figure 5:
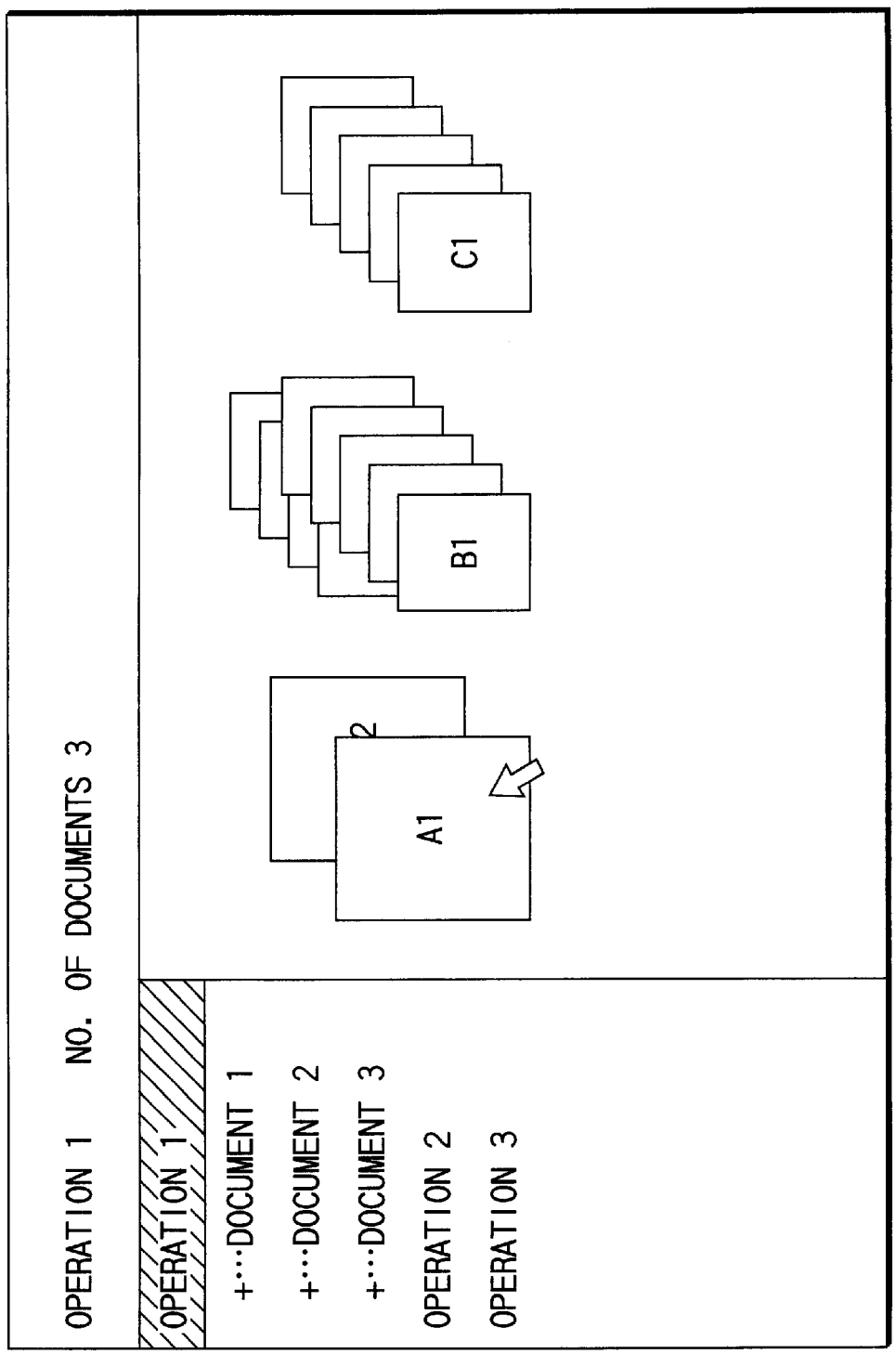
FIG. 5 is an illustration to help explain an example of displaying documents on the basis of the contents of the document management table.

FIG. 5 shows an example of the document display screen for the document management data stored in the document management table 23a in the data storage section 23 of the network server 2.

FIG. 5 illustrates a screen displayed on the display section 32 when operation 1 has been selected on the operation display screen of FIG. 4. At the top of the screen, the character string [OPERATION 1] indicating what operation is displayed and the character string [NUMBER OF DOCUMENTS 3] indicating the number of documents constituting the operation are displayed. On the left side, a list of operations and a list of documents constituting the selected operation are displayed in hierarchical-structure form. On the right side, the documents constituting the selected operation are listed in icons. The icons representing the documents are displayed in such a manner that the manuscript images constituting the documents are laid one on top of another in the order of manuscripts. This enables the user to understand the hierarchical structure of operations and documents at a glance.

Figure 6:
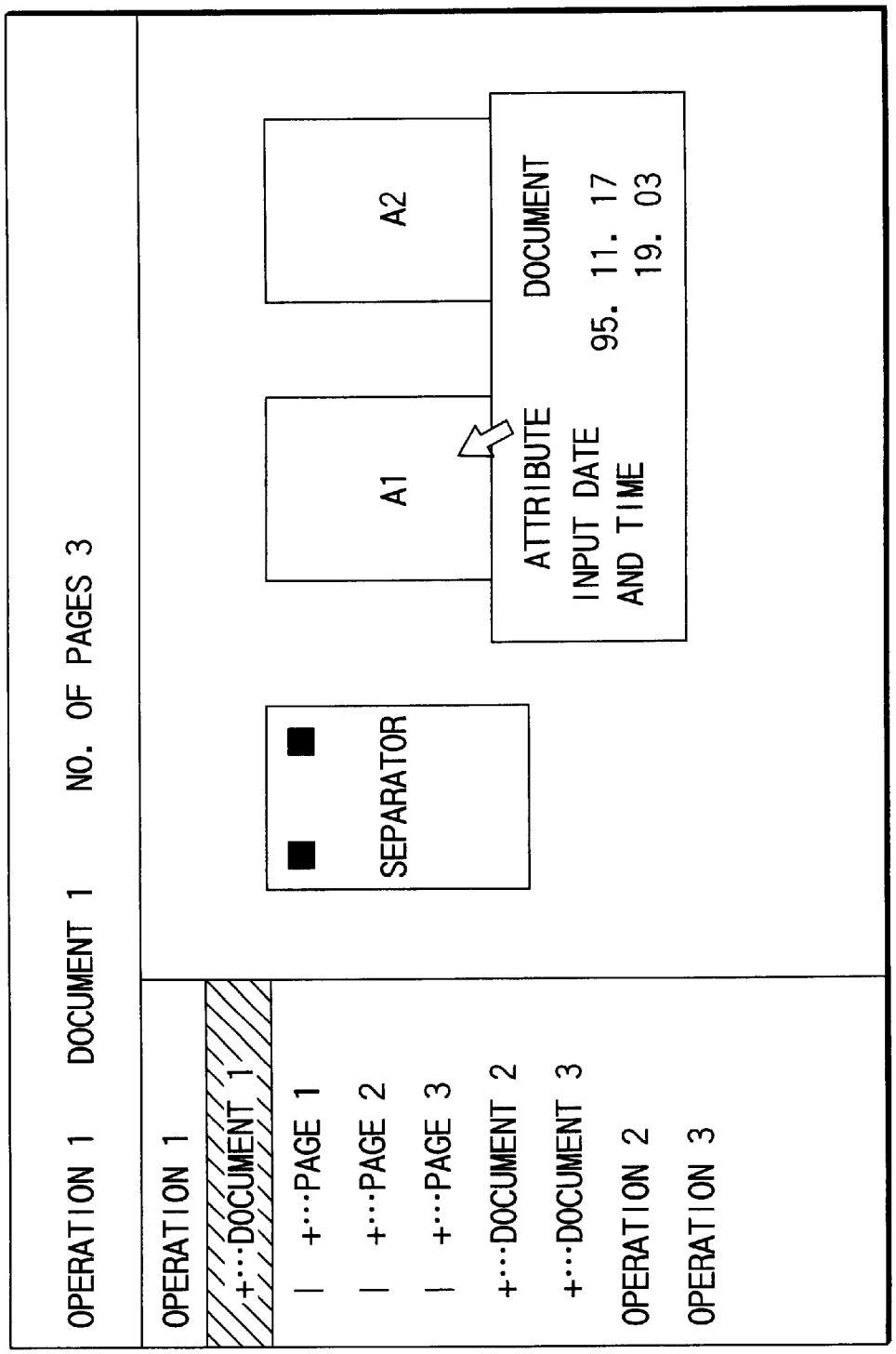
FIG. 6 is an illustration to help explain an example of displaying pages on the basis of the contents of the page management table.
Figure 7:
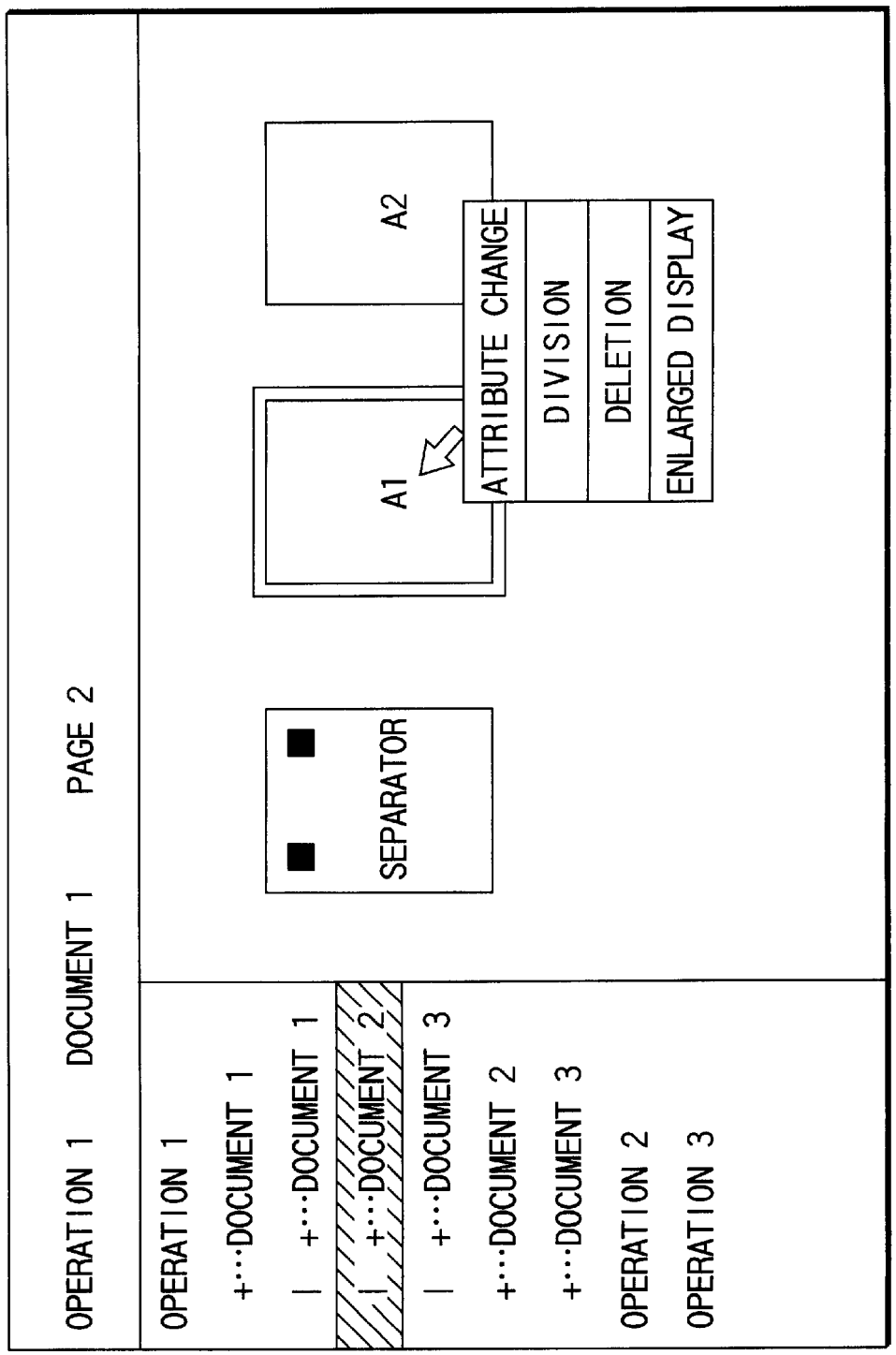
FIG. 7 is an illustration to help explain an example of displaying pages on the basis of the contents of the page management table.

FIGS. 6 and 7 show an example of the page display screen for the page management data stored in the page management table 23c in the data storage section 23 of the network server 2.

FIG. 6 shows the screen displayed on the display section 32 when document 1 has been selected on the document display screen of FIG. 5. At the top of the screen, the character strings [OPERATION 1] and [DOCUMENT 1] indicating which document in what operation, and the character string [NUMBER OF PAGES 3] indicating the number of pages constituting the documents are displayed. On the left side, a list of operations, a list of documents constituting the selected operation, and a list of pages constituting the selected document are displayed in hierarchical-structure form. On the right side, a list of reduced-size images of the pages constituting the selected document including the sheet is displayed.

As shown in FIG. 6, when the user moves the arrow-shaped mouse pointer (arrow) appearing on the screen with the mouse and the position indicated by the mouse pointer rests over the reduced-size image for each page, the attribute of the page and the date and time at which it was read appear in the rectangular area under the mouse pointer.

The user moves the mouse pointer to the reduced-size image of the displayed page and left-clicks the mouse, thereby selecting the displayed page. When the page has been selected by the user, the selected page is highlighted by a bold frame. At the same time, in the hierarchical structure display area on the left side, the selected page is also highlighted in such a manner that it is displayed in reverse.

Furthermore, as shown in FIG. 7, commands for pages can be selected from a menu. For example, the menu is displayed when the user right-clicks the mouse after having selected the page. This enables the user to recognize the selected page at a glance and select a command for the page.

FIG. 8 illustrates an example of a detailed display screen showing information on each page stored in the operation management table 23a in the data storage section 23 of the network server 2.

As shown in FIG. 8, at the top of the screen, the character string [OPERATION 1 DOCUMENT 1 PROPERTY OF PAGE 1] indicating what page in which document in what operation is displayed. Displayed in the middle of the screen are character strings indicating when each page was inputted, which document in what operation each page belongs to, in what order the documents were inputted, whether the attribute is for a sheet or a document, and the names of files in which the image data has been actually stored. For the attribute of a page, multiple-choice buttons are displayed to allow the user to set either [SHEET] or [DOCUMENT]. At the bottom, [OK] and [CANCEL] buttons to allow the user to decide whether the setting for the property of the page is correct are displayed. This enables the user to change the property of each page by choosing between document and sheet and pressing the OK button.

FIG. 9 shows an example of the caution display screen that displays a caution for asking the user whether documents inputted in different operations should be combined.

As shown in FIG. 9, at the top of the caution display column, the character string [CAUTION] indicating a caution is displayed. In the middle, the character string [ALTHOUGH THE SELECTED DOCUMENTS WERE NOT INPUTTED IN ONE OPERATION, IS IT ALL RIGHT TO COMBINE THEM?] indicating the contents of the caution is displayed. At the bottom, the buttons [YES] and [NO] to allow the user to specify the decision are displayed. When the documents read in different operations are combined, the caution is given to the user. The display prompts the user to confirm whether to combine the documents. This enables the user to confirm whether to combine the documents when the user specifies the combining of documents read in different operations, which prevents erroneous operations.

Figure 10:
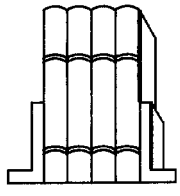
FIG. 10 is an illustration to help explain a representation according to the processing state in each operation.

FIG. 10 illustrates an example of a screen distinctively showing the processing state of each operation in the operation management data stored in the operation management table 23a in the data storage section 23 of the network server 2.

As shown in FIG. 10, at the top of the screen, the character string [OPERATION LIST] indicating the contents of the display appear. On the left side, a list of operations carried out until now is displayed together with operation IDs in hierarchical structure form. On the right side, the processing states for the individual operations are displayed distinctively by icons (state icon) representing the processing states.

For example, when the documents have been divided according to sheet sensing, a [BOOK] icon appears. When the scanning process is now in progress, a [SCANNER] icon appears. When sheet sensing is now in progress, an [HOURGLASS] icon appears. This enables the user to understand the processing state, at a glance, of the image data inputted in each operation. Therefore, it is possible to prevent the user from carrying out an operation on the image data being read or in the course of sheet sensing without knowing the processing state of the image data.

Figure 11:
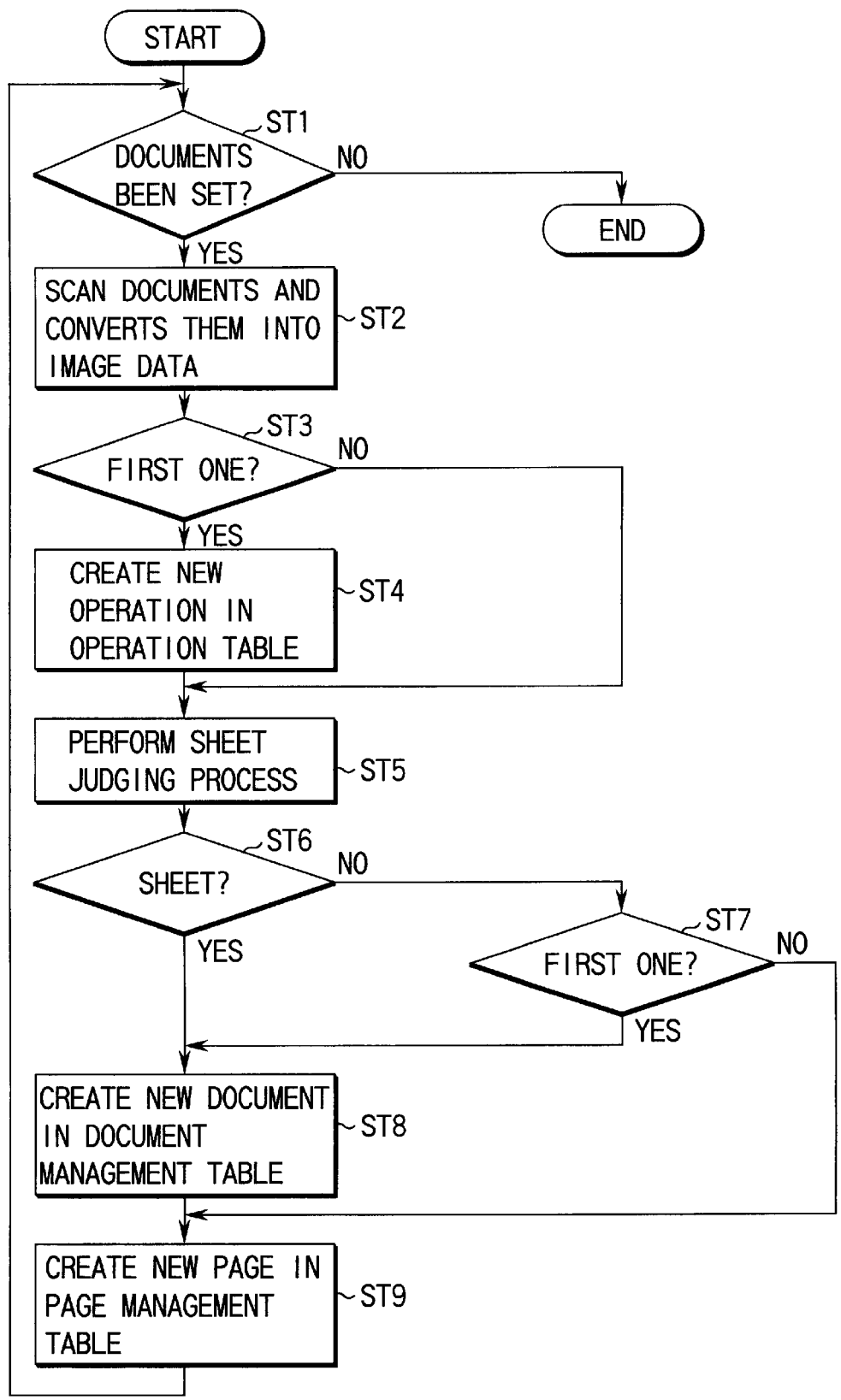
FIG. 11 is a flowchart to help explain the process of sensing manuscripts one by one for the sheet.

Next, the process of reading the manuscripts set in the automatic document feeder 13 while judging one by one whether the manuscript is a sheet or a document will be explained by reference to a flowchart in FIG. 11.

After having inserted sheet S between documents of manuscripts and set them in the automatic document feeder 13, the user gives a manuscript read instruction from the operation section 34 of the user PC 3. Then, the control section 11 of the copying machine 1 causes a sensor (not shown) in the automatic document feeder 13 to judge whether the manuscripts have been set in a specific position (step 1). If the judgment has shown that the manuscripts have been set in place, the control section 11 will read, one by one, the manuscripts set in the automatic document feeder 13 and converts them into image data (step 2).

At this time, the control section 11 judges the direction of the face of the set manuscripts and the manuscript reading order predetermined on the basis of the position in which the manuscripts are fed.

For example, if the restriction put on the automatic document feeder 13 provided on the copying machine 1 is to set the reading face of the manuscripts upward and read the manuscripts, starting at the bottommost page of the manuscripts, [READ IMAGES, STARTING AT THE LAST PAGE OF THE MANUSCRIPTS] will be set. On the basis of the setting, the control section 11 judges that the manuscript reading order is starting at the last page up to the first page. If the restriction is to set the reading face of the manuscripts downward and read the manuscripts, starting at the bottommost page of the manuscripts, [READ IMAGES, STARTING AT THE FIRST PAGE OF THE MANUSCRIPTS] will be set. On the basis of this setting, the control section 11 judges that the manuscript reading order is starting at the first page down to the last page.

When reading the first manuscript, converting it into image data, and judging that reading should be started at the first page, the control section 11 of the copying machine 1 transmits a control signal to the control section 21 of the network server 2. The control signal indicates that the image read into the control section 21 of the network server 2 is about the first manuscript.

When receiving the control signal, the control section 21 of the network server 2 judges whether the image data is about the first manuscript (step 3). If the judgment has shown that the image is about the first manuscript, the control section will issue new operation IDs (operation 1, operation 2, . . . ) and create an operation management data table 23a (step 4). At this time, in the newly created operation management table 23a, the input date and input time are set for the date and time at which the operation data was issued and [STILL SCANNING] is set for the processing state of the operation.

Next, when reading the first manuscript, the control section 11 of the copying machine 1 judges whether the read-out image is about sheet S (step 5). For example, if the image is about sheet S of FIG. 3, the control section 11 will judge that the manuscript is sheet S, when a predetermined number of black pixels are present in a predetermined rectangular area in a predetermined position on the image data of the read-out manuscript.

Then, when judging that the read-out manuscript is sheet S (step 6) or that it is the first manuscript (the first page of the manuscripts), not sheet S (step 7), the control section 21 of the network server 2 issues a new document ID for a document belonging to the operation data created at step 4 and stores the document data in the document management table 23b (step 8).

At this time, the control section 21 of the network server 2 stores the order of manuscripts in the manuscript order column on the basis of the manuscript reading order judged by the control section 11 of the copying machine 1 so that the order of manuscripts may agree with the order in which the manuscripts have been actually set. For example, when reading is started at the first page of the manuscripts, the document data is created in the order in which manuscripts are read and the manuscript order is stored, starting at [1]. When reading is started at the last page, the manuscript order [1] is stored for the document data for the image data of the first read manuscript. New document data is created for the next image data. The manuscript order [1] is stored for the newly created document data and the manuscript order [2] is stored for the previously created document data.

Then, the control section 21 issues new page IDs page 1, page 2, . . . ) as page data items belonging to the previously created document data, regardless of whether the image data on the manuscript read by the copying machine 1 is about a sheet or a document and stores the page data items in the page management table 23c (step 9). In this case, too, as with the document data, when reading is started at the first page of the manuscripts on the basis of the manuscript reading order judged by the control section 11 of the copying machine 1, the manuscript order is stored so that the reading order may be equal to the manuscript order. When reading is started at the last page of the manuscripts, the manuscript order is stored so that the reading order may be the reverse of the manuscript order.

When having judged that the manuscript image is about sheet S, the control section 11 of the copying machine 1 stores [SHEET] for attribute. Otherwise, it stores [DOCUMENT]. Then, it stores the actually read image data into a file and puts the file name in the image file name column. In this case, it increments the number of pages in the document data created at step 7.

If having judged that the manuscript image read at step 7 is about neither sheet S nor the first manuscript, the control section 21 of the network server 2 passes control to step 9, where it creates page data and stores it in the page management table 23c.

The series of procedures (step 1 to step 9) is repeated until it is judged at step 1 that the set manuscripts have run out, or that the manuscripts set in the automatic document feeder 13 have run out. When it is judged at step 1 that no manuscript is left, it is judged that the reading process of manuscripts has been completed and reading process complete is set in the processing state stored in the operation management table 23a. As a result, it is possible to store the document data items divided by the sheet in the management tables 23a, 23b, and 23c in the data storage section 23 on an operation basis, while keeping the order of manuscripts.

Figure 12:
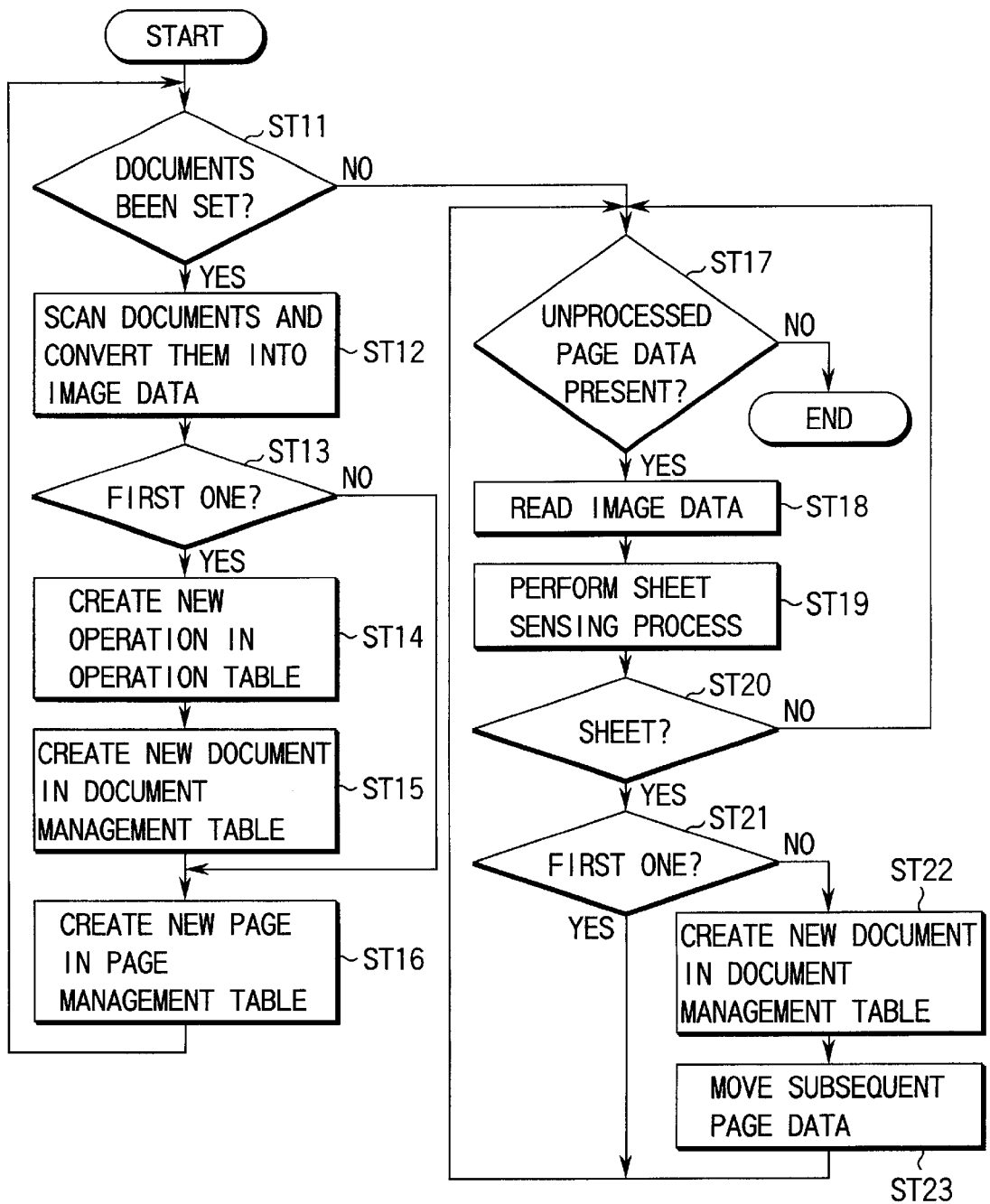
FIG. 12 is a flowchart to help explain the process of sensing the sheet after the manuscripts have been read.

Next, the procedure for sensing the sheet after all the manuscripts set in the automatic document feeder 13 have been read will be explained by reference to a flowchart in FIG. 12.

After the user has set manuscripts in the automatic document feeder 13 and given a manuscript read instruction from the operation section 34, the control section 11 of the copying machine 1 judges whether manuscripts have been set in the automatic document feeder 13 (step 11). If the judgment has shown that manuscripts have been set in the automatic document feeder 13, the image reading section 12 reads one manuscript and converts it into image data on the manuscript image (step 12). The converted image data is transmitted to the network server 2 via the network interface 20. Receiving the image data, the control section 21 of the network server 2 judges whether the image data is about the first manuscript (step 13). If the judgment has shown that the image data is about the first manuscript, the control section 21 will issue a new operation ID and store the operation data in the operation management table 23a (step 14). At the same time, the control section will set the processing state of the operation data as still scanning. Then, the control section 21 will issue a new document ID for a document belonging to the operation data, and store the document data in the document management table 23b (step 15). Moreover, the control section 21 will issue a new page ID for a page belonging to the document data previously created from the read-out image and store the page data in the page management table 23c (step 16). At this time, the control section 21 will store the manuscript order in the manuscript order column so that the order of manuscripts may agree with the order of manuscripts actually set from the manuscript reading order judged by the control section 11.

If it is judged at step 13 that the image data is not about the first manuscript, control will proceed to step 16. The operations created at step 14 and step 15 without issuing new operation IDs or document IDs are stored. A new page is created for a page belonging to the document and the page data is stored in the page management table 23c.

The series of procedures (step 11 to step 16) is repeated until it is judged at step 11 that the manuscripts set in the automatic document feeder 13 have run out. As a result, each page of the read-out image data is stored as a document belonging to one operation in the data storage section 23 in such a manner that the manuscript order is managed according to the management tables 23a, 23b, and 23c.

If the control section 21 has judged at step 11 that no manuscript has been set in the automatic document feeder 11, the main control section 21 will retrieve the page management table 23c corresponding to the document data belonging to the operation data created at step 14 and judge whether there is any page not subjected to the sheet sensing process (step 17). If no newly created operation data is present, the processing will be ended. If the judgment has shown that there is an unprocessed page, the control section 21 will change the processing state of the operation data created at step 14 to still sheet sensing and start to sense the sheet for the page. First, the control section 21 reads, in the order of manuscripts, the image data in the page belonging to the document stored in the operation data created at step 14 from the data storage section 23 (step 18). Depending on whether a specific number of black pixels are present in a specific area in the read-out data, the control section 21 judges whether the image data is about a sheet image (step 19). If having judged that it is about a sheet image (step 20), the control section 21 will judge whether the manuscript order stored for the page is for the first manuscript (step 21).

If having judged that it is not for the first manuscript, the control section will issue a new manuscript ID, create a new document management table 23b, and store the document data (step 22). Furthermore, the control section will set the image judged to be about a sheet up to the last page in the manuscript order as a page belonging to the new document data, create a page management table 23c belonging to the new document data, and move the page data. Next, concerning the page data after the movement, the control section will judge at step 17 whether there is any page data item not subjected to the sheet sensing process. The same processes as in step 18 to step 23, and step 17 are carried out for all the pages. When having judged at step 17 that there is no unprocessed page and the sheet sensing process of all the pages belonging to the operation data created at step 14 has been ended, the control section changes the processing state of the operation data to sheet sensing complete and complete the reading process. As a result, it is possible to store the sheet document data items divided by the sheet sensed in the sheet sensing process of all the page data items into the operation management table 23a, document management table 23b, and page management table 23c on an operation basis.

Figure 13:
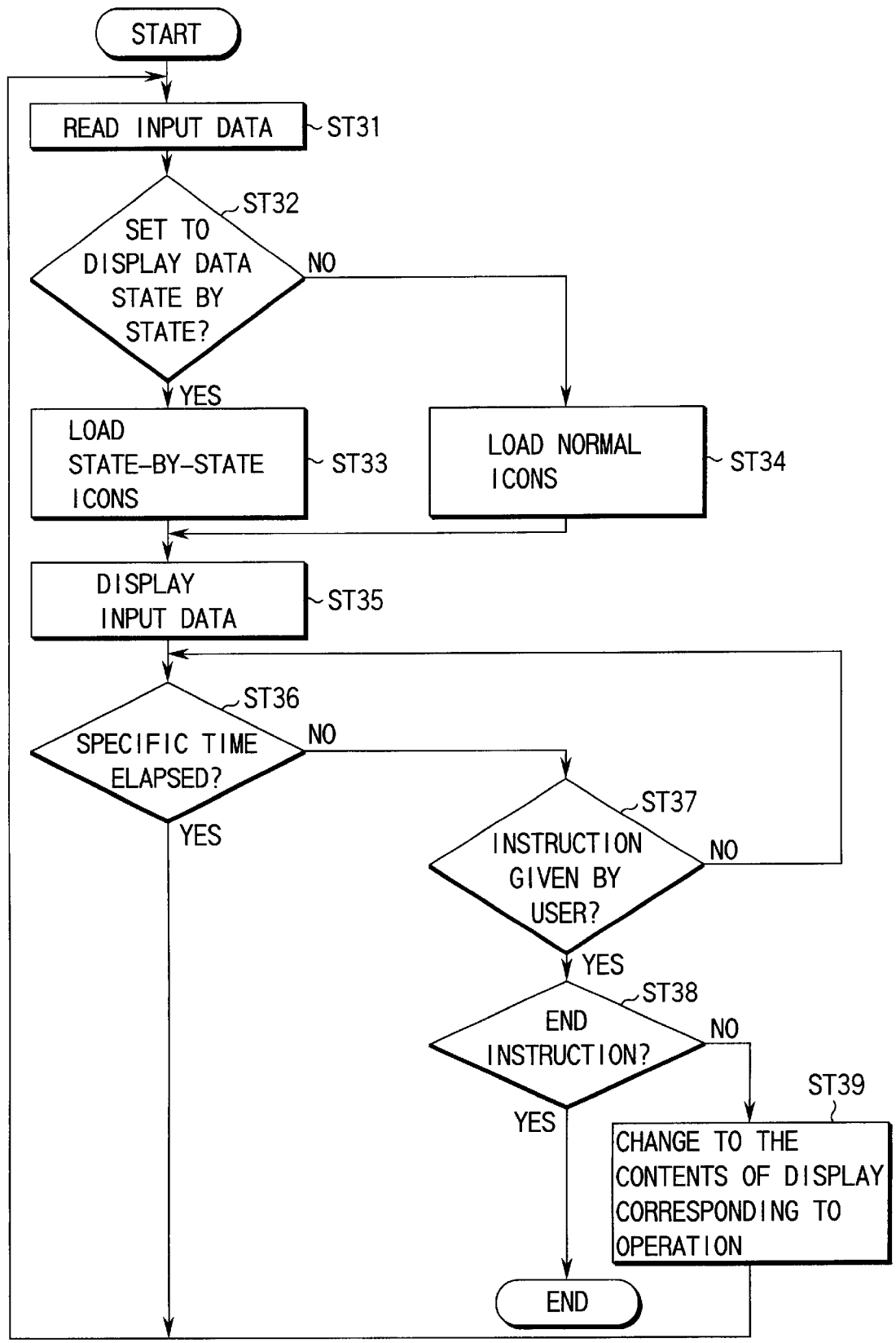
FIG. 13 is a flowchart to help explain the process of displaying icons according to the processing state in each operation.

Next, an example of the procedure for displaying the management data in the operation management table 23a, document management table 23b, and page management table 23c will be explained by reference to a flowchart in FIG. 13.

The control section 31 of the user PC 3 reads the management data items stored in the operation management table 23a, document management table 23b, and page management table 23c in the data storage section 23 of the network server 2 on the basis of the operation by the user (step 31) and makes displays as shown in FIGS. 5, 6, and 7 according to a hierarchical structure of operations, documents, and pages.

At this time, the control section 31 judges whether the user's setting is to display icons state by state (step 32).

If having judged that state-by-state icons (state icons) should be displayed, the control section 31 will load the state-by-state icons corresponding to the processing states stored in the operation management table 23a from the storage section 33 (step 33) and display them on the display section 32 (step 35). When having judged that icons are not be displayed state by state, the control section 31 will load usual icons (normal icons) from the storage section 33 without making a distinction by the processing state stored in the operation management table 23a (step 34) and display them on the display section 32 (step 35). While the state icons and normal icons are stored in the storage section 33, they may be stored in any suitable place in the system.

After more than a specific time has elapsed (step 36) since the icons were displayed at step 35, the control section 31 returns control to step 51 and reads the processing state again from the operation management table 23a and redisplays the state icon or normal icon according to the contents.

If the user operates on the displayed contents (step 37) before the specific time has elapsed at step 36, the control section 31 will judge whether the user has given a display end instruction (step 38). If having judged that it is not a display end instruction, the control section will judge what instruction to which object. On the basis of the result of the judgment, the control section will change the display screen of the display section 32 to the contents of display corresponding to the operation (step 39). For example, with normal icons on the screen as shown in FIG. 5, when the user double-clicks the mouse on [OPERATION 1] icon, the control section senses the instruction given by the user (step 37) and judges that it is not an end instruction (step 38). Then, according to [DETAILED DISPLAY INSTRUCTION] for [OPERATION 1], the control section 31 searches the document management table 23b for the document data belonging to operation 1 and changes the representation to the display as shown in FIG. 6 (step 39). When having judged at step 38 that the use has given an [END INSTRUCTION], the control section ends the display. This enables the processing state of each operation to be displayed in icons and the user to know the processing state, which prevents the user from selecting the document belonging to the operation being carried out or a detailed display of pages. For instance, when a large number of pages are inputted at a time, the display section 32 distinctively displays whether the document starting to be scanned is still being scanning, whether it is in the course of sheet sensing, or whether the sheet sensing process has ended and the documents been divided automatically. This enables the user to understand which one is an effective data item at a glance and operate on only the effective data item, which alleviates the burden of operation on the user.

Figure 14:
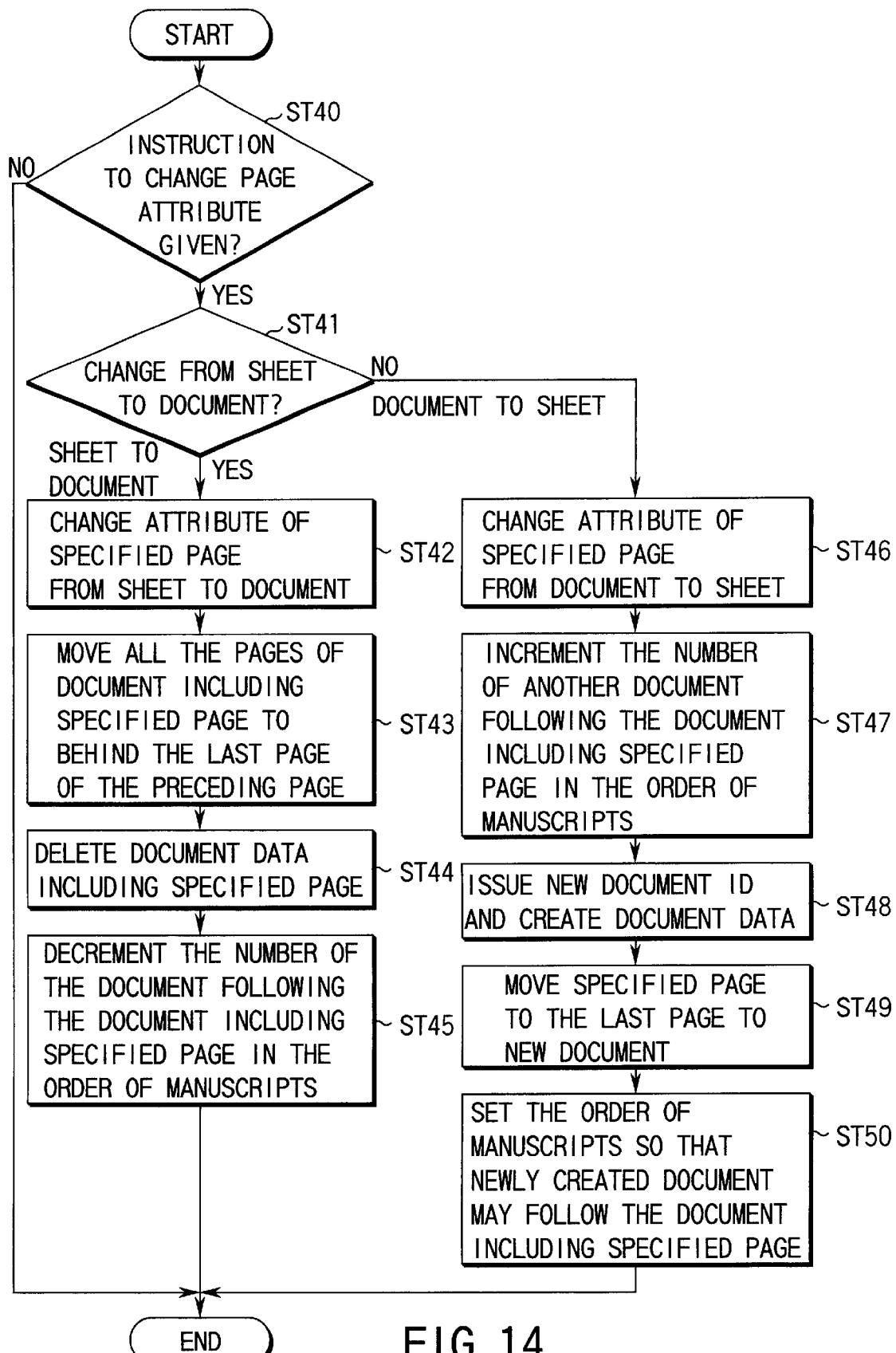
FIG. 14 is a flowchart to help explain the process of dividing and combining the documents by changing the attributes of the pages.

Next, an example of the procedure for changing the contents of each management table managed by the control section 21 when the user has given an instruction to change the property of an image will be explained by reference to a flowchart in FIG. 14.

When in the reading process, either a sheet or a document has been sensed erroneously, the property of each page read is changed according to the change instruction given by the user. After the read-out image has been processed, the user moves the mouse pointer onto the reduced-size screen of the page on the screen on which the reduced-size screen of the page is displayed as shown in FIG. 6, refers to the displayed attribute and the input date and time, and searches for the page judged erroneously to be a sheet or a document. After having found the page whose attribute has been sensed erroneously and selected the page, the user rests the mouse pointer over the screen of the page and right-clicks the mouse, thereby causing the menu screen as shown in FIG. 7 to appear.

Then, the control section 31 judges the display of the menu screen and displays a menu screen that allows the user to select attribute change, division, deletion, or enlarged representation as shown in FIG. 7. When the user has selected attribute change on the menu screen, the control section judges the change of the attribute for the selected page and starts to change the attribute.

Specifically, when sensing an instruction to change the attribute of the page, the control section 31 judges what page the change instruction is intended for. Additionally, depending on whether the instruction is to change from [SHEET] attribute to [DOCUMENT] attribute (step 41), the control section judges whether the instruction is an instruction to change from [SHEET] attribute to [DOCUMENT] attribute or an instruction to change from [DOCUMENT] attribute to [SHEET] attribute. For example, in FIG. 7, when the user has selected a page and selected [ATTRIBUTE CHANGE] on the menu for the page, the control section 1 judges that the instruction is an instruction to display page information and displays detailed information on the page as shown in FIG. 8 on the display section 32. Then, when the user changes [PAGE ATTRIBUTE] and clicks [OK] button, the control section 31 senses [PAGE ATTRIBUTE CHANGE INSTRUCTION] and judges whether the user has changed the attribute from [SHEET] to [DOCUMENT] or from [DOCUMENT] to [SHEET] (step 41). When having sensed the page attribute change instruction given by the user, the control section 31 change the attribute of the page stored in the page management table 23c according to the user's instruction.

When having judged that the user has given an instruction to change from [SHEET] attribute to [DOCUMENT] attribute, the control section 31 judges that [NORMAL DOCUMENT IMAGE HAS BEEN SENSED MISTAKENLY FOR SHEET] and changes the attribute of the specified page from sheet to document (step 42). Then, the control section additionally combines the document including the page for which attribute change has been specified with the immediately preceding document in the order of manuscripts.

For example, in a case where the data items as shown in FIG. 3 have been managed, when the image attribute of page 1 of document 2 is changed from [SHEET] to [DOCUMENT] (step 41), the attribute of page 1 of document 2 is changed to [DOCUMENT] (step 42) and all the pages of document 2 are moved behind the last page of [DOCUMENT], a document immediately before document 2 (step 43). Then, the data in [DOCUMENT 2] including the specified page is deleted from the document management table 23b (step 44). At the same time, the number of document 3 following the document including the specified page in the order of manuscripts is decremented from [3] to [2] and the document ID is changed to document 2.

When having judged that the user has given an instruction to change the attribute from [DOCUMENT] to [SHEET] (step 41), the control section 31 judges that [WHAT SHOULD HAVE BEEN A SHEET IMAGE WAS UNABLE TO BE SENSED AS A SHEET BY MISTAKE] and changes the attribute of the specified page from [DOCUMENT] to [SHEET] (step 46). Then, the control section performs the process of dividing the page for which the change instruction has been given up to the last page of the document as a new document.

For example, when the user has given an instruction to change the attributes of operation 1, document 2, and page 5 from [DOCUMENT] to [SHEET] in the management data items as shown in FIG. 3, the control section 31 changes the attribute of page 5 from [DOCUMENT] to [SHEET] (step 46). Because the document ID for the newly created document is changed from document 2 to document 3, the document IDs for the present document 3 and later are incremented by one in such a manner that the present document 3 is changed to document 4 and the present document 4 is changed to document 5 (step 47). Then, a new document belonging to operation 1 is created (step 48) and page 5 to page 10 of document 2 are moved to the newly created document (step 49). Additionally, the new document is set in document 3 so that the newly created document may follow document 2 (step 50).

This makes it possible to perform the processes of dividing and combining documents by just changing the attributes of each page, while maintaining the order of manuscripts in documents or pages even after the documents have been divided or combined. For example, when the system has sensed mistakenly that the image is about [SHEET], the user can cause the documents divided by the image to be combined automatically by just changing the attribute of the image to [DOCUMENT]. Therefore, the user need not operate, taking the input sequence into account, which eases the burden on the user.

Figure 15:
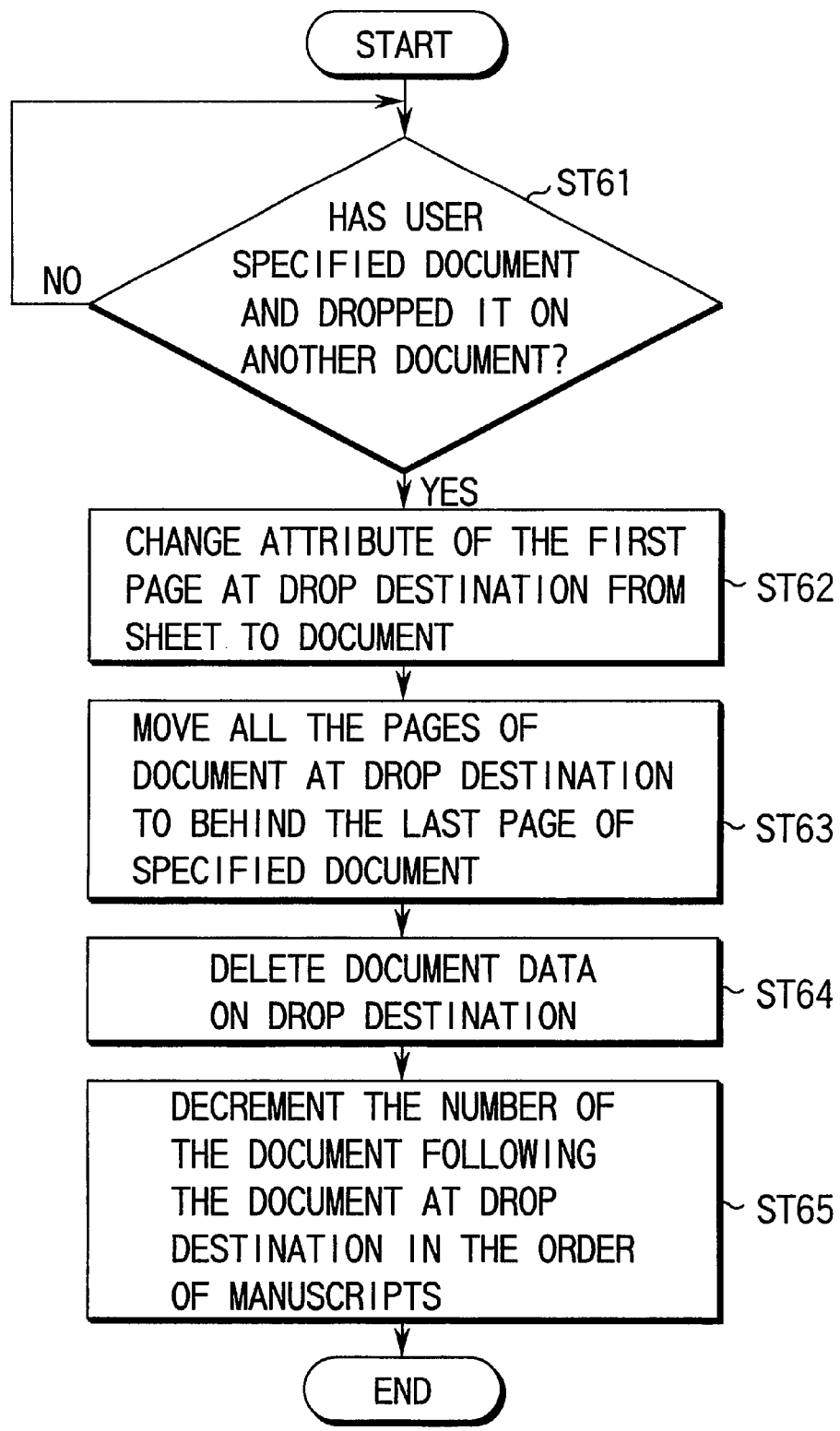
FIG. 15 is a flowchart to help explain the process of combining documents by operating icons representing documents.

Next, the process of combining documents on a document display screen as shown in FIG. 5 will be explained by reference to a flowchart in FIG. 15.

First, when the user has specified a document and drags and drops the document on another document, the control section 31 senses the operation (step 61) and judges that the user has given an instruction to [COMBINE THE SPECIFIED DOCUMENT WITH THE DOCUMENT ON WHICH THE DOCUMENT HAS BEEN DROPPED]. By this judgment, the control section 31 changes the attribute of the first page stored in the page management table 23c to [DOCUMENT] attribute according to the document on which the document has been dropped (step 62). Then, the pages of the document on which the document has been dropped are moved to behind the last page of the specified document while keeping the order of manuscripts (step 63). When the pages have been moved, the document data about the drop destination is deleted (step 64) and the number of the document following the drop destination document in the order of manuscripts is decremented (step 65).

For example, when the user drags document 1 icon and drops it on document 2 icon on a document display screen as shown in 5 by using the mouse of the operation section 34 (step 61), the control section 31 of the user PC 3 judges that the user has given an instruction to [COMBINE DOCUMENT 1 WITH DOCUMENT 2]. Then, the control section 31 changes the attribute of the first page of document 2 to [DOCUMENT] (step 62) and moves the page data items in page 1 to page 5 of document 2 in such a manner that they become page 4 to page 8 following the last page of the present document 1 (step 63). Next, the control section 31 deletes the data in document 2 (step 64), decrements the number of the document following document 2, or the number of document 3, in the order of manuscripts from [3] to [2] (step 65), and changes the manuscript ID from document 3 to document 2. As a result, document 1 and document 2 are combined with the order of manuscripts maintained and document 3 is managed in data as a document following document 1.

This enables the user to perform the combining process by giving an instruction to combine documents without knowing the attribute of each page.

Figure 16:
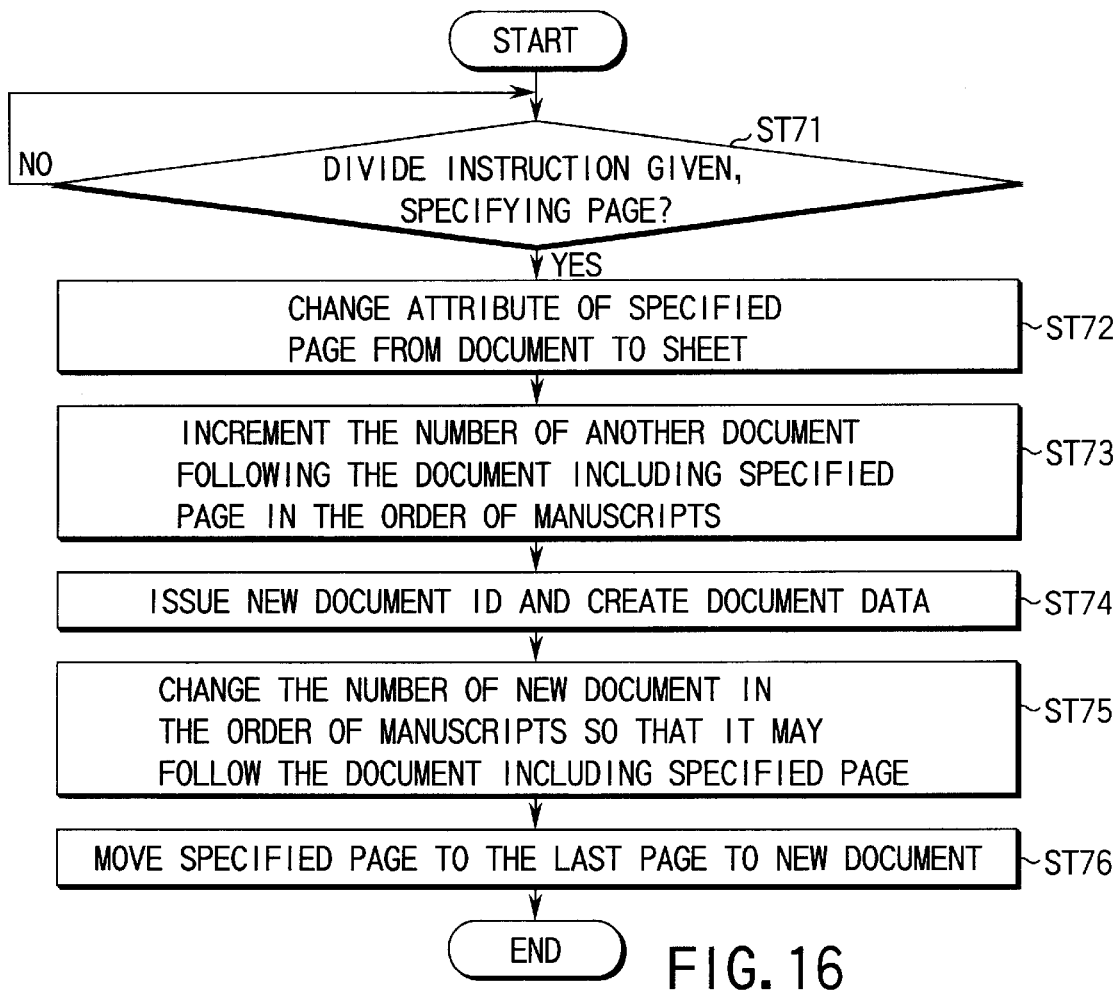
FIG. 16 is a flowchart to help explain the process of selecting division on the displayed menu from a page image and dividing the documents.

Next, the process of dividing documents as a result of the user giving an instruction to divide documents on a page display screen as shown in FIG. 7 will be explained by reference to a flowchart in FIG. 16.

First, the user specifies a page and selects division instruction from the menu for the page on the page display screen. Then, the control section 31 senses the operation and judges that the user has given an instruction to [DIVIDE DOCUMENTS AT SPECIFIED PAGE] (step 71). When having judged document division, the control section 31 changes the attribute of the specified page from [DOCUMENT] to [SHEET] (step 72). Then, the number of the document following the document including the specified page in the order of manuscripts is incremented (step 73). Next, the control section 31 issues a new document ID, creates document data (step 74), and changes the number of the document in the order of manuscripts in such a manner that the document follows the document including the specified page (step 75). Then, the page data items from the specified page up to the last page of the document including the specified page are moved to the page management table 23c for the new document, with the number of the document in the order of manuscripts in the document being kept (step 76).

For example, when the user opens a menu screen on the icon for page 6 of document 2 on the page display screen appearing on the basis of the page management table 23a in the data managed as shown in FIG. 3 and selects division on the menu screen (step 71), the control section 31 judges that the user has given an instruction to [DIVIDE DOCUMENT 2 INTO DOCUMENT OF PAGE 1 TO PAGE 5 AND DOCUMENT OF PAGE 6 TO PAGE 10]. Then, the control section 31 changes the attribute of page 6 of document 2 from [DOCUMENT] to [SHEET] (step 72). Then, the control section increments the number of the document following document 2, or the number of document 3, in the order of manuscripts from [3] to [4] (step 73). Next, the control section 31 issues a new manuscript ID [DOCUMENT 4] and creates data for document 4 (step 74). At this time, the control section 31 sets the number of document 4 to a value following [2], the number of document 2 in the order of manuscripts, that is, at [3] (step 75). Then, the control section moves the data items corresponding to page 6 of document 2 up to the last page of document 2 (page 10) to the page management table 23c of document 4 (step 76) and changes the number of documents belonging to operation 1 from [1] to [4].

This enables the user to divide one document into plural documents without knowing the attribute of each page.

Figure 17:
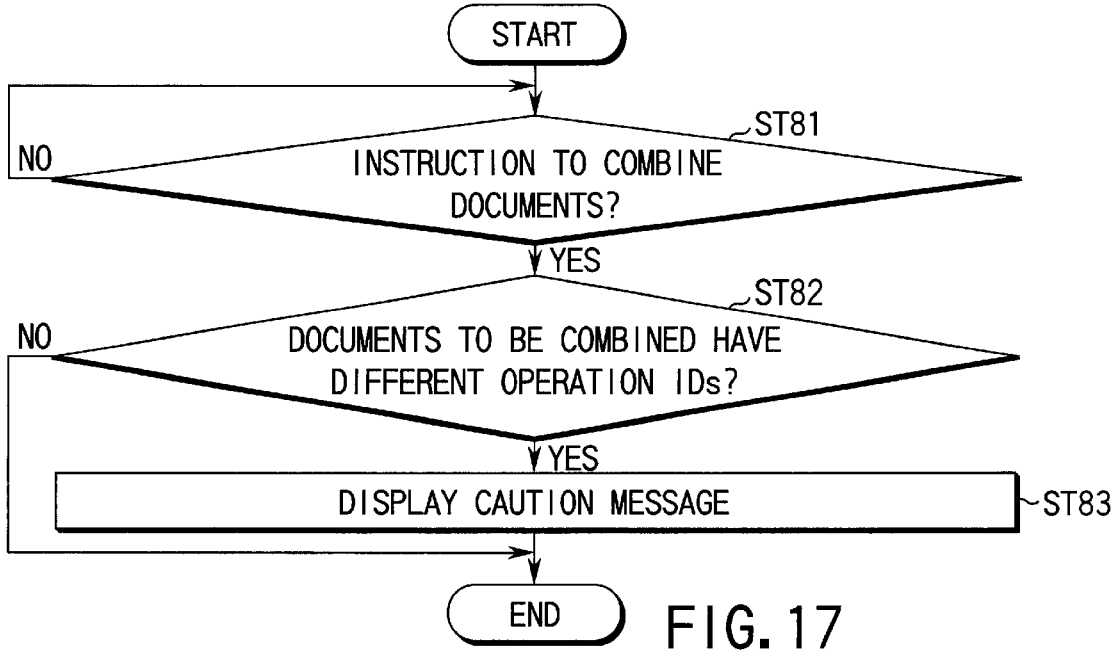
FIG. 17 is a flowchart to help explain the process of displaying a caution to user.

Next, the process of giving a caution to the user when the user combines documents read in different operations will be explained by reference to a flowchart in FIG. 17.

When the control section 31 has judged that the user has given an instruction to [COMBINE DOCUMENTS] (step 81), the control section 21 checks whether the documents to be combined have been inputted in the same operation. If they have not been inputted in the same operation (step 82), the control section 31 will display a caution message on the display section 32 (step 82).

For example, if the control section 31 has judged that the user has given an instruction to [COMBINE DOCUMENT 3 IN OPERATION 1 WITH DOCUMENT 1 IN OPERATION 2] (step 81), the control section 21 will check the operation IDs for the two documents. If the result of the check has shown that the operation IDs for the two documents differ from each other, the control section 21 will judge that the documents have been inputted in different operations. Then, the control section 21 will display a caution message as shown in FIG. 9 on the display section 32 (step 83).

This prevents the user from combining documents read in different operations by mistake. For example, when the user drags a document icon and drops it on another document icon to combine the documents, if the documents have not been inputted in one operation, it is conceivable that they are unrelated to the process of correcting the automatic division made according to sheet sensing. The system automatically senses the situation and displays a caution to inform the user of the erroneous operation, which reduces the number of erroneous operations.

As described in detail, with the present invention, it is possible to provide an image processing system which facilitates the operation on the automatically divided documents after reading and makes the processing state of documents clear, when reading documents consecutively in one operation and automatically dividing the consecutively read images of manuscripts using a special sheet as an end.

Specifically, according to the present invention, there is provided an image processing system capable of correcting an erroneous operation in the dividing process by an easy operation by the operator and realizing the process of editing groups quickly and reliably by changing the attributes of document images and sheet images later suitably in carrying out an automatic dividing process using a special sheet.

What is claimed is:

1. An image forming apparatus comprising:

reading means for reading images of manuscripts;

attribute judging means for judging types of attributes of said images read by said reading means;

storage means for storing said images read by said reading means, on the basis of rules corresponding to said attributes judged by said attribute judging means;

attribute changing means which changes said attributes of said images stored in said storage means, when receiving from an operator an instruction to combine, in documents, said images stored in said storage means; and image forming means for forming an image on the basis of said images stored in said storage means;

wherein said attribute changing means further includes attribute changing means for changing one of said attributes of said images stored in said storage means from a sheet attribute meaning that said images are about sheets to a document attribute meaning that said images are about documents, when receiving from the operator an instruction to combine said images stored in said storage means.

2. An image forming apparatus comprising:

reading means for reading images of manuscripts;

attribute judging means for judging types of attributes of said images read by said reading means;

storage means for storing said images read by said reading means, on the basis of rules corresponding to said attributes judged by said attribute judging means;

attribute changing means which changes said attributes of said images stored in said storage means, when receiving from an operator an instruction to combine, in documents, said images stored in said storage means; and image forming means for forming an image on the basis of said images stored in said storage means;

wherein said attribute changing means further includes caution displaying means for displaying a caution, if said images stored in said storage means and instructed to combine have not been read consecutively by said reading means, when receiving from the operator an instruction to combine said images stored in said storage means.

3. An image forming apparatus characterized by comprising:

reading means for reading images of manuscripts;

attribute judging means for judging types of attributes of said images read by said reading means;

storage means for storing said images read by said reading means, on the basis of rules corresponding to said attributes judged by said attribute judging means;

attribute changing means for changing the types of said attributes of said images stored in said storage means;

image forming means for forming an image on the basis of said images stored in said storage means; and displaying means for displaying an icon meaning still reading when said reading means is in the middle of reading said images of said manuscripts, an icon meaning still judging when said attribute judging means is in the middle of judging the attributes of said images, or an icon meaning the completion of attribute judgment when said attribute judging means has completed judging the attributes of said images.

* * * * *